US009702720B2

(12) United States Patent
Nogawa et al.

(10) Patent No.: US 9,702,720 B2
(45) Date of Patent: Jul. 11, 2017

(54) NAVIGATION SERVER FOR DETERMINING LOCATION-BASED ADVERTISEMENT EFFECTIVENESS

(75) Inventors: Tadafumi Nogawa, Tokyo (JP); Yuichiro Ishido, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 13/498,033

(22) PCT Filed: Jun. 25, 2010

(86) PCT No.: PCT/JP2010/060855
§ 371 (c)(1),
(2), (4) Date: Mar. 23, 2012

(87) PCT Pub. No.: WO2011/036926
PCT Pub. Date: Mar. 31, 2011

(65) Prior Publication Data
US 2012/0179535 A1    Jul. 12, 2012

(30) Foreign Application Priority Data
Sep. 25, 2009    (JP) .................................. 2009-221295

(51) Int. Cl.
*G06Q 30/02* (2012.01)
*G01C 21/36* (2006.01)
*G06Q 50/30* (2012.01)

(52) U.S. Cl.
CPC ............. *G01C 21/36* (2013.01); *G06Q 30/02* (2013.01); *G06Q 30/0242* (2013.01); *G06Q 50/30* (2013.01)

(58) Field of Classification Search
CPC .. G06Q 30/00; G06Q 30/026; G06Q 30/0242; G01C 21/36
See application file for complete search history.

(56) References Cited

U.S. PATENT DOCUMENTS 6,654,684 B2 * 11/2003 Shinada ............ G01C 21/3679
701/431
8,315,905 B1 * 11/2012 Adair ................. G06Q 30/0261
705/14.63

(Continued)

FOREIGN PATENT DOCUMENTS

CN    101534315    9/2009
JP    11-65434    3/1999

(Continued)

OTHER PUBLICATIONS

"Decision Models for Wireless Advertising", by Arvind Kumar Tripathi, University of Connecticut, 2003.*

(Continued)

*Primary Examiner* — Pan Choy
(74) *Attorney, Agent, or Firm* — Nelson Mullins Riley & Scarborough LLP; Anthony A. Laurentano

(57) ABSTRACT

A navigation server and the like capable of improving determination accuracy of advertisement effectiveness is provided. According to a navigation system of the present invention, it is determined whether or not one or a plurality of time in which a position of a navigation device 200 (an user or a vehicle 2) at each time satisfies "a first condition" in relationship with a position of a business operator satisfies "a second condition" in relationship with a temporal factor with respect to business transaction of the business operator. Thereafter, according to the determination result, an interest level of the user with respect to the business operator and the like is evaluated as "a third index value".

3 Claims, 3 Drawing Sheets

(56) References Cited

U.S. PATENT DOCUMENTS

| | | | |
|---|---|---|---|
| 8,566,028 B2* | 10/2013 | Bradicich et al. | 701/426 |
| 2002/0016671 A1* | 2/2002 | Shinada et al. | 701/211 |
| 2003/0078832 A1* | 4/2003 | Alvarez | G06Q 30/02 705/14.41 |
| 2004/0044576 A1* | 3/2004 | Kurihara | G06Q 30/02 705/14.41 |
| 2004/0267447 A1* | 12/2004 | Takizawa | G01C 21/3415 701/416 |
| 2005/0078177 A1* | 4/2005 | Gotanda | 725/32 |
| 2006/0217848 A1* | 9/2006 | Oesterling et al. | 701/1 |
| 2008/0139181 A1* | 6/2008 | Lokshin | G06Q 30/02 455/414.1 |
| 2009/0171559 A1* | 7/2009 | Lehtiniemi | G06Q 30/0205 705/7.34 |
| 2010/0222032 A1* | 9/2010 | Griffin | G06Q 30/02 455/414.1 |
| 2010/0222078 A1* | 9/2010 | Tysowski | G06Q 30/02 455/456.3 |
| 2011/0055005 A1* | 3/2011 | Lang | 705/14.45 |
| 2011/0320259 A1* | 12/2011 | Roumeliotis | G06Q 30/02 705/14.41 |
| 2012/0303446 A1* | 11/2012 | Busch | G06Q 30/0267 705/14.45 |

FOREIGN PATENT DOCUMENTS

| | | |
|---|---|---|
| JP | 2001-134581 | 5/2001 |
| JP | 2001-134650 | 5/2001 |
| JP | 2003-337905 | 11/2003 |
| JP | 2005-182636 | 7/2005 |
| JP | 2006-330943 | 12/2006 |
| JP | 2007-232610 | 9/2007 |
| JP | 2008-242976 | 10/2008 |
| WO | 2009/011031 A1 | 1/2009 |
| WO | 2009/060538 A1 | 5/2009 |
| WO | 2011/036926 A1 | 3/2011 |

OTHER PUBLICATIONS

"Semantically Enhanced and Efficient Location Services for Preserving Mobile Consumer's Privacy", by Mahmoud Youssef Mohamed; Graduate Program in PH.D. in Management Information Technology, May 2005.*

"Mobile Advertising Adoption by Multinationals", by Shintaro Okazaki, Automous University of Madrid, Madrid, Spain, Internet Research; 2005; 15, 2; ProQuest Central, p. 160.*

"System and Method for Aggregating Location-Based Search Requests to Augment Advertising Location Selection", IBM, Sep. 22, 2009, An IP.com Prior Art Database Technical Disclosure, IPCOM000188121D.*

"Mobile Yellow Pages with User Interest and Location Sensing Ensemble", by Saptarshi Debroy et al., TENCON 2008, 2008 IEEE Region 10 Conference.*

"Location-Based Services with Publish/Subscribe", by IBM, Jul. 30, 2003, An IP.com Prior Art Database Technical Disclosure, IPCOM00018649D.*

"Personal Yellow Pages System", Anonymously, Jan. 11, 2006, An IP.com Prior Art Database Technical Disclosure, IPCOM000133034D.*

"Marketing & Logistics", by Anonymous, Emerald Management Reviews; 2004; 33, 6; ProQuest Central, p. 99.*

"Mobile Advertising Adoption by Multinationals", by Shintaro Okazaki, Internet Research; 2005; 15, 2; ProQuest Central, p. 160.*

"Mobile Advertising or Mobile Marketig. A Need for a New Concept?", by Jaana Tahtinen, Frontiers of e-Business Research 2005, Conference Proceedings of eBRF 2005 pp. 152-164.*

Japanese Office Action for Application No. 2009-221295, 3 pages, dated Nov. 13, 2012.

International Search Report for Application No. PCT/JP2010/060855, pp. 1-2, dated Aug. 24, 2010.

Chinese Office Action for Application No. 201080041991.8, 11 pages, dated Apr. 3, 2014.

* cited by examiner

NAVIGATION SERVER FOR DETERMINING LOCATION-BASED ADVERTISEMENT EFFECTIVENESS

Related Applications

This application is a 35 U.S.C. 371 national stage filing of International Application No. PCT/JP2010/060855, filed Jun. 25, 2010, which claims priority to Japanese Patent Application No. 2009-221295 filed on Sep. 25, 2009 in Japan. The contents of the aforementioned applications are hereby incorporated by reference.

TECHNICAL FIELD

The present invention relates to a navigation server and the like having communication function with a navigation device.

BACKGROUND ART

It is an important concern for an advertiser to determine an advertisement effectiveness, in constructing an advertisement strategy. Therefore, in order to determine the advertisement effectiveness intended for an user of a mobile phone, a technical method explained as follows have been proposed (refer to Patent Document 1).

This method makes the user browse an advertisement through a mobile phone, set a commercial establishment and the like which is an advertiser as a destination position, and refer a guiding path to the destination position. And, by using a self position measurement function of the mobile phone, whether or not the user who owns a mobile phone visited a vicinity of the commercial establishment or the like as the destination position is determined. That is, according to this method, the fact that the commercial establishment or the like which is the advertiser is set as the destination position, and the positional relationship between the destination position and the user, are used as a criterion for determining the advertisement effectiveness.

PRIOR ART REFERENCES

Patent Documents

Patent document 1: Japanese Patent Laid-Open No. 2006-330943

SUMMARY OF THE INVENTION

Problems to be Solved by the Invention

However, it is not possible to distinguish the case where the user merely passed through the destination position, or the case where the commercial establishment or the like as the destination position is not in a condition for performing business transaction, and the like, only with the criterion for determination that the user visited the vicinity of the commercial establishment or the like as the destination position. Therefore, it is difficult to determine whether or not the advertisement effectiveness is obtained as is anticipated by the advertiser.

Therefore, the present invention aims at providing a navigation server and the like which is capable of improving determination accuracy of the advertisement effectiveness.

Means for Solving the Problems

In order to solve the above-mentioned problems, a navigation server of the present invention is a navigation server having communication function with a navigation device; comprising: a first support arithmetic processing element configured to recognize a position where a business operator providing goods or service related to an advertisement information exists, and a temporal factor with respect to business transaction with the business operator, and to recognize a position of the navigation device at each time measured by the navigation device; a second support arithmetic processing element configured to determine whether or not one or a plurality of time in which the position of the navigation device satisfies a first condition in relationship with the position of the business operator satisfies a second condition in relationship with the temporal factor, on the basis of the position and the temporal factor of the business operator and the position of the navigation device at each time, and to evaluate a third index value which represents an interest level of the user with respect to the business operator or the goods or the service thereof in accordance with the determination result (a first aspect of the invention).

According to the navigation server of the present invention, it is determined whether or not the one or a plurality of the time, in which the position at each time of the navigation device satisfies "the first condition" in relationship with the position of the business operator, satisfies "the second condition" in relationship with to the temporal factor with respect to the business transaction of the business operator. And in accordance with the determination result, the interest level of the user with respect to the business operator or the goods or the service thereof (hereinafter arbitrarily referred to as "business operator and the like") is evaluated as "the third index value".

By doing so, it becomes possible to determine the advertisement effectiveness, specifically the interest level the user bears to the business operator and the like as the third index value with high accuracy, not only based on the simple positional relationship between the business operator and the user of the navigation device, but taking into consideration the time-sequential positional relationship of the two or the time variable behavior of the positional relationship.

In the navigation server of the first aspect of the invention, the first support arithmetic processing element may be configured to recognize a business hours of the business operator as the temporal factor, and the second support arithmetic processing element may be configured to evaluate the third index value, taking a fact that the position of the navigation device is included in a business transaction range taking the position of the business operator as a reference as the first condition, and taking a fact that the one or a plurality of the time in which the position of the navigation device satisfies the first condition is included in the business hours of the business operator as the second condition (a second aspect of the invention).

According to the navigation server of this configuration, it becomes possible to avoid the situation where the interest level of the user with respect to the business operator and the like is evaluated highly, even when the user visited a vicinity area of the business operator after the business hours of the business operator, and there is little probability that the user is intending a business transaction with the business operator. As a result, the advertisement effectiveness may be determined with high accuracy.

In the navigation server of the first aspect of the invention, the first support arithmetic processing element is configured to recognize a typical business transaction time range with the business operator as the temporal factor, and the second support arithmetic processing element is configured to evaluate the third index value, taking a fact that the position of the navigation device is included in the business transaction range taking the position of the business operator as a reference as the first condition, and taking a fact that a sojourn time of the user in the business transaction range calculated on the basis of a plurality of the time in which the position of the navigation device satisfies the first condition is included in the typical time range as the second condition (a third aspect of the invention).

According to the navigation server of this configuration, it becomes possible to avoid the situation where the interest level of the user with respect to the business operator and the like is evaluated highly, even when the user sojourns in the vicinity range of the business operator for an extremely short time or extremely long time, and there is little probability that the user is intending a business transaction with the business operator in view of the typical time range necessary for the business transaction. As a result, the advertisement effectiveness may be determined with high accuracy.

In the navigation server of the first aspect of the invention, the first support arithmetic processing element is configured to recognize existence or nonexistence of a registration of the position of the business operator as a destination position candidate in the navigation device or a terminal device of the user, on the basis of communication with the navigation device or the terminal device, and the second support arithmetic processing element is configured to evaluate a first index value representing the interest level of the user with respect to the business operator or the goods or the service thereof, according to the existence or nonexistence of the registration of the position of the business operator as the destination position candidate in the navigation device, which is recognized by the first support arithmetic processing element (a fourth aspect of the invention).

According to the navigation server of this configuration, the interest level the user bears to the business operator and the like is evaluated as the first index value, according to the existence or nonexistence of the possibility that the user makes the navigation device execute guiding or leading to the position of the business operator as the destination position of the user in the future, and consequently, the level of possibility the user visits the business operator.

In the navigation server of the first aspect of the invention, the first support arithmetic processing element is configured to recognize existence or nonexistence of a setting of the position of the business operator as a destination position in the navigation device, on the basis of communication with the navigation device, and the second support arithmetic processing element is configured to evaluate a second index value representing the interest level of the user with respect to the business operator or the goods or the service thereof, according to the existence or nonexistence of the setting of the position of the business operator as the destination position in the navigation device, which is recognized by the first support arithmetic processing element (a fifth aspect of the invention).

According to the navigation server of this configuration, the interest level the user bears to the business operator and the like is evaluated as "the second index value", according to the existence or nonexistence of the intention of the user to make the navigation device guide or lead to the position of the business operator as the destination position of the user, and consequently, the level of probability of the user traveling to or have visited the business operator. By evaluating the second index value in addition to the third index value, the advertisement effectiveness may be determined with high accuracy.

In the navigation server of the first aspect of the invention, the second support arithmetic processing element may be configured to transmit at least the third index value or an analysis result in accordance thereto, to the terminal device of the advertiser of the advertisement information (a sixth aspect of the invention).

According to the navigation server of this configuration, it becomes possible to make the advertiser recognize the advertisement effectiveness exerted by the advertisement information.

In the navigation server of the first aspect of the invention, the first support arithmetic processing element may be configured to recognize a current position or a departure position and the destination position of the navigation device, on the basis of communication with the navigation device, and the second support arithmetic processing element may be configured to search a support route connecting the current position or the departure position and the destination position of the navigation device which is recognized by the first support arithmetic processing element, and to make the navigation device recognize the support route (a seventh aspect of the invention).

According to the navigation server of this configuration, sufficiency of each of the first condition and the second condition is determined as is explained above in the course of searching of the navigation route by the navigation device and guiding by the navigation route to the destination position of the user, and the third index value is evaluated according to this determination result. There may be a case where the position at which the business operator exists is set as a target position. As a result, the advertisement effectiveness, specifically the level of interest the user bears to the business operator and the like may be determined with high accuracy.

In order to solve the above-mentioned problems, a navigation system of the present invention is a navigation system configured from a navigation device and a navigation server having communication function with the navigation device, wherein the navigation server comprises: a first support arithmetic processing element configured to recognize a position where a business operator providing goods or service related to the advertisement information, and a temporal factor with respect to business transaction with the business operator, and to recognize a position of the navigation device at each time measured by the navigation device, and a second support arithmetic processing element configured to determine, on the basis of the position of the business operator and the temporal factor and the position of the navigation device at each time recognized by the first support arithmetic processing element, whether or not one or a plurality of time in which the position of the navigation device satisfies a first condition in relationship with the position of the business operator satisfies a second condition in relationship with the temporal factor, and to evaluate a third index value representing an interest level of the user with respect to the business operator or the goods or the service thereof, according to the determination result.

According to the navigation system of the present invention, the advertisement effectiveness, specifically the level of interest the user bears to the business operator and the like may be determined with high accuracy, not only based on the simple positional relationship between the business operator and the user of the navigation device, but taking into consideration the time-sequential positional relationship of the two.

MODE FOR CARRYING OUT THE INVENTION

Explanation is given on the embodiments of the navigation system of the present invention.

(Configuration of the Navigation System)

First, explanation is given on the configuration of the navigation system.

Figure 1:
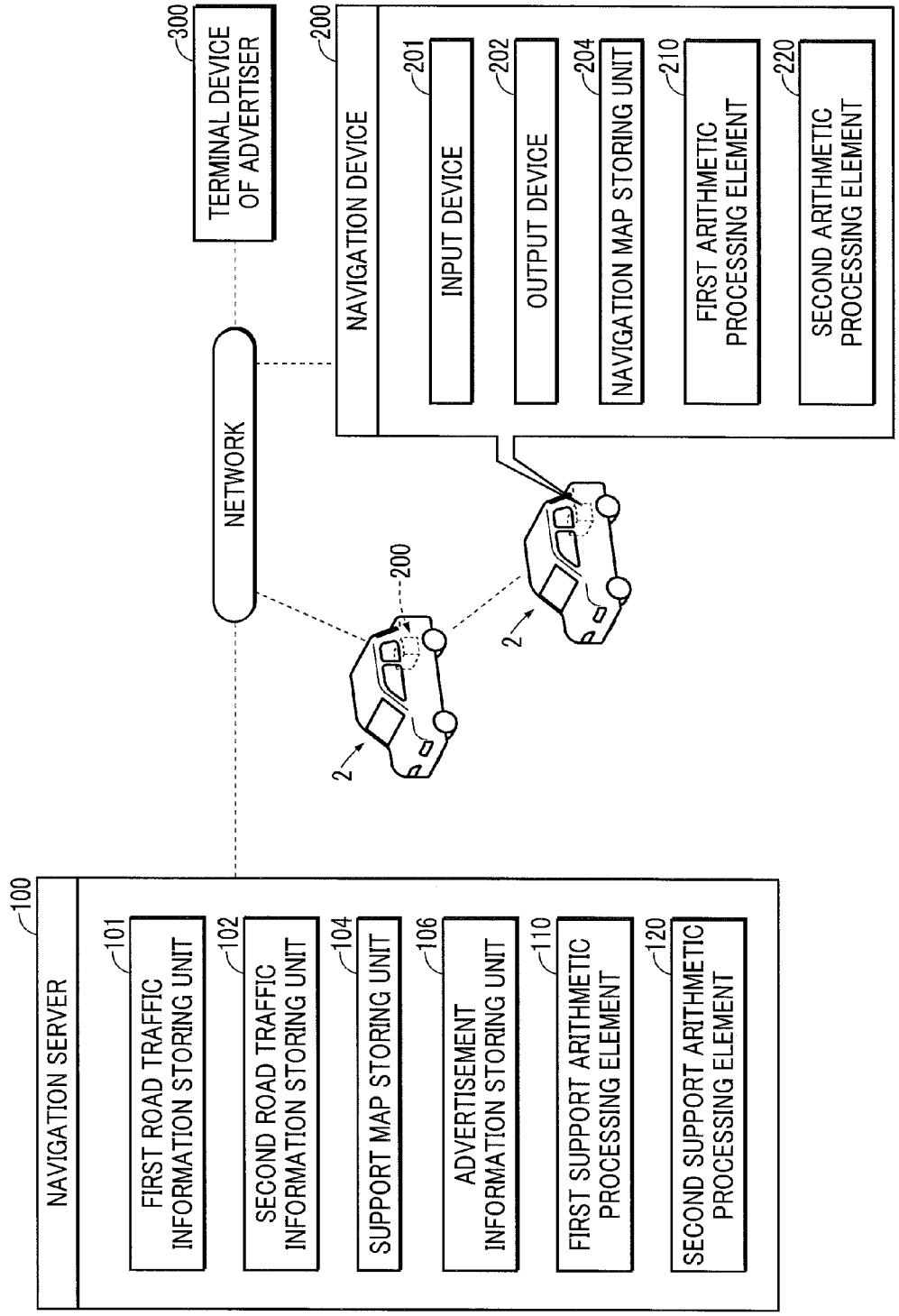
FIG. 1 is a configuration diagram of a navigation system of the present invention.

The navigation system shown in FIG. 1 is configured from a navigation server 100 and a navigation device 200 mounted on an automobile 2. The navigation device 200 may be mounted on mobile devices other than the automobile, and may also be carried by a user.

The navigation server 100 has a communication function with the navigation device 200 via a network, and is configured from one or a plurality of server computers. As the communication network, the internet, telephone communication network, or a communication network using satellite broadcasting may be adopted.

The navigation server 100 is equipped with a first road traffic information storing unit 101, a second road traffic information storing unit 102, a support map storing unit 104, an advertising information storing unit 106, a first support arithmetic processing element 110, and a second support arithmetic processing element 120.

The first road traffic information storing unit 101 is stored with a first road traffic information (required traveling time, existence or nonexistence of a traffic congestion or the like in individual link) on the basis of probe information (a position of an individual probe car at each time) transmitted or uploaded to the navigation server 100 from the navigation device 200 mounted on the automobile 2 as a probe car or a floating car.

The second road traffic information storing unit 102 is stored with a second road traffic information (in addition to the required traveling time, existence or nonexistence of the traffic congestion or the like in individual link, information representing existence or nonexistence of traffic control in each link, information representing existence or nonexistence of events and the type of events in the periphery of each link, and the like) transmitted from a server of a road traffic information center or the like to the navigation server 100.

The support map storing unit 104 is stored with "a support map information". By the support map information, the position, shape and posture and the like of the individual link constituting the road are expressed by a series of coordinates (latitude, longitude), or (latitude, longitude, altitude)). Further, individual link is provided with link identification information for identifying individual link and data representing a road type. The support map information is configured so that "a business operator identification information" for identifying each of a plurality of business operators, "a position of such business operator", and "a business transaction range" taking the position of such business operator as a reference, are specified in a corresponding manner.

The advertising information storing unit 106 is stored with "the business operator identification information", "an advertisement information", and "a temporal factor" in a corresponding manner. The advertisement information may be transmitted from a terminal device 300 of an advertiser, a terminal device of an advertisement agency (not shown) commissioned by such advertiser and the like to the navigation server 100 via a network.

A part of or all of the storing units 101 through 104 configured from a memory or a storage device may be configured as a separate database server from the navigation server 100.

The first support arithmetic processing element 110 is configured so as to recognize various information such as criterion for determining advertisement effectiveness and the like.

The second support arithmetic processing element 120 is configured to execute arithmetic processing for determining the advertisement effectiveness, on the basis of information recognized by the first support arithmetic processing element 110.

The navigation device 200 is configured from an ECU or a computer as a hardware mounted on the automobile 2, and a navigation program as a software stored in the memory for imparting various functions to such computer. The navigation program may be stored in the memory (ROM) of the in-vehicle computer from the beginning, but a part of or all of the program may also be downloaded or broadcasted from the navigation server 100 via the network or the satellite broadcasting to the in-vehicle computer, at an arbitrary timing such as when a request is made from the in-vehicle computer, and may be stored in the memory (EEPROM, RAM) and the like.

The navigation device 200 is equipped with an input device 201, an output device 202, a navigation map storing unit 204, a first arithmetic processing element 210, and a second arithmetic processing element 220.

The input device 201 is configured from operating buttons or a microphone arranged in a center console or the like of the automobile 2, and enables a user to perform various settings by operation or voice output.

The output device 202 is a display device arrange in the center console or the like of the automobile 2, and displays or outputs navigation map information and the like.

The navigation map storing unit 204 is stored with the navigation map information and the like to be output to the output device 202. In the navigation map information, the position, shape and posture or the like of the individual link constituting the road are expressed by a series of coordinates. Further, individual link is tagged with the link identification information for identifying the individual link. Even though the definitions of the coordinates and the like in the navigation map information and the support map information are different due to the different specifications and data architectures therebetween, it is possible to match the links by tagging the identical links with common link identification information.

The first arithmetic processing element 210 is configured to recognize various information, such as a current position p(t) of the vehicle 2 (and consequently the navigation device 200), on the basis of communication with the navigation server 100 or output signals from sensors mounted on the vehicle 2 and the like.

The second arithmetic processing element 220 is configured to make the navigation server 100 recognize various information, on the basis of communication with the navigation server 100.

Here, the term a constituent element as a hardware "recognizes" information means that the constituent element performs a possible information processing on a piece of information to prepare the piece of information ready for other information processing, for example, the constituent element receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packets; and stores in memory or the like the calculated information or the like.

Further, a constituent element as a hardware "outputs" information means that the constituent element outputs the information in any possible form such as display, voice output, vibration output and the like, which may be recognized by a human being by means of five senses thereof such as eyesight, hearing, touch, and the like.

(Basic Function of the Navigation System)

Brief explanation will be given on the basic function of the navigation system of the above-explained configuration.

The navigation device 200 recognize a departure position $p_1$ and a destination position $p_2$ of the user or the vehicle 2. The destination position $p_2$ is set by the user through operation of the input device 201. The current position of the vehicle 2 at the time of setting the destination position $p_2$ or a position deviated therefrom in the traveling direction of the vehicle 2 by a predetermined distance, is recognized as the departure position $p_1$. The departure position $p_1$ and the destination position $p_2$ of the user are transmitted from the navigation device 200 to the navigation server 100.

In accordance thereto, at the navigation server 100, the first support arithmetic processing element 110 recognizes the departure position $p_1$ and the destination position $p_2$ of the user. Further, the second support arithmetic processing element 120 searches for or calculates one or a plurality of support routes R connecting the departure position $p_1$ and the destination position $p_2$, on the basis of the first road traffic information and the second road traffic information, in addition to the support map information. As a search policy of the support route R, for example, a policy to preferentially searching an appropriate route in view of a part of or all of a predicted necessary traveling time, traveling distance, traveling fee (toll fee) and predicted fuel consumption may be adopted.

In the navigation device 200, a first arithmetic processing element 210 recognizes the data. Further, the second arithmetic processing element 220 searches for or calculates one navigation route r on the basis of the data, in addition to the navigation map information. The navigation route r does not have to completely coincide with the support route R, and may be searched for according to the search policy adopted by the navigation device 200. The navigation route r is displayed with the navigation map information at the output device 202.

Further, in the navigation device 200, the first arithmetic processing element 210 measure the current position of the user or the vehicle 2 at each time, and stores the same in the memory or the storage device together with the time of measurement. The position of the vehicle 2 is measured periodically (at regular time intervals) or intermittently (every time the vehicle 2 reaches a prescribed position such as a terminal point of the link).

The time-series positions stored in the memory or the storage device, that is, the combination of the time and the position of the vehicle 2 measured at that time, is transmitted from the vehicle 2 to the navigation server 100 as "a probe information". Or, the probe information is transmitted to the navigation server 100 periodically or intermittently (for example, every time the data volume of the probe information reaches a constant value).

The probe information is also used as a material for preparing the first road traffic information. As will be explained later, the probe information is also used as a criterion for advertisement effectiveness.

(The Applied Function of the Navigation System)

Explanation will be given on the applied function of the navigation system of the above-mentioned configuration, focusing on the function of the navigation server 100.

Figure 2:
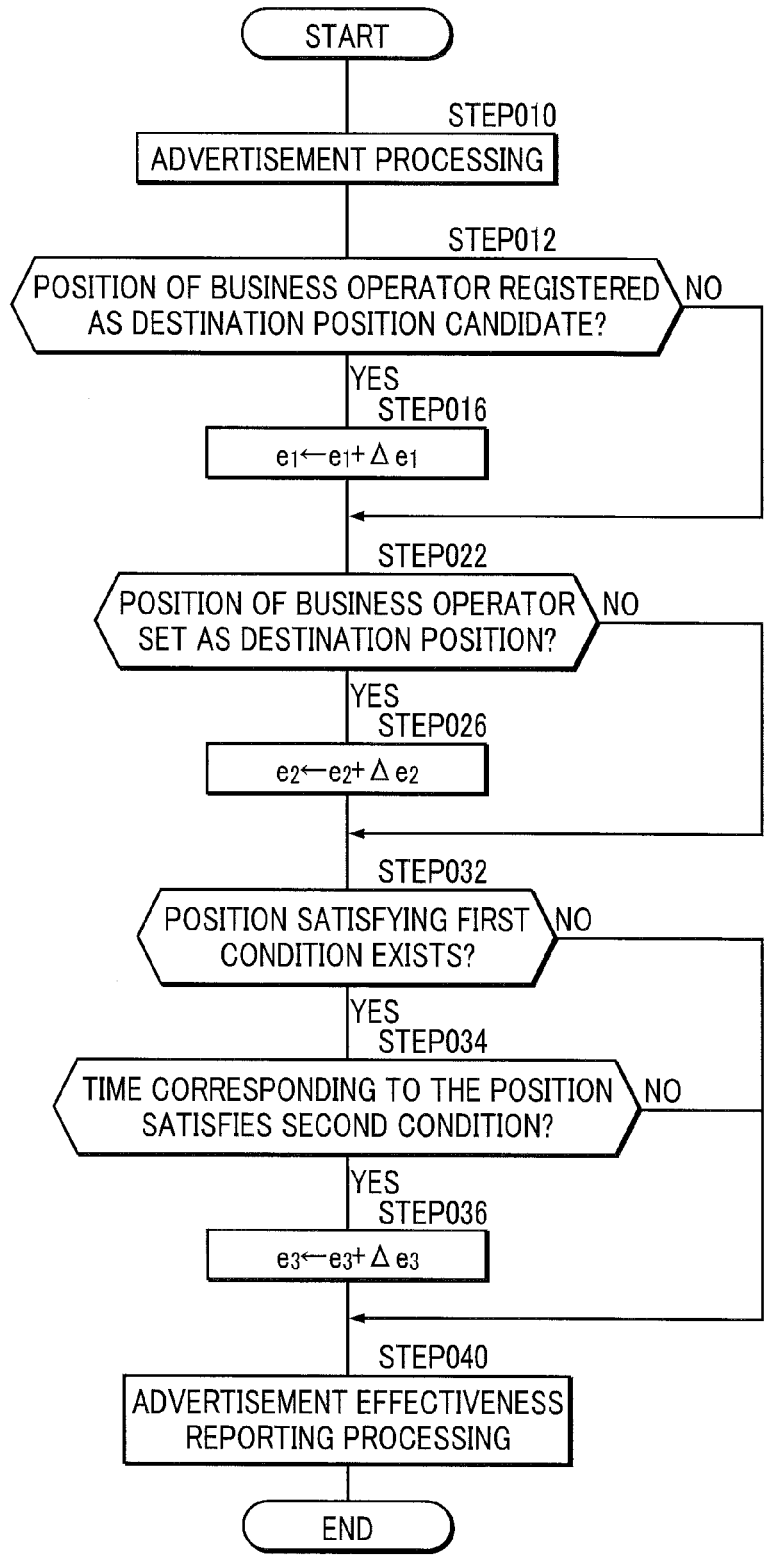
FIG. 2 is an explanatory view of a function of the navigation system of the present invention.

First, the second support arithmetic processing element 120 executes "an advertisement processing" (FIG. 2/STEP010).

By doing so, the advertisement information stored in the advertising information storing unit 106 is delivered or broadcasted from the navigation server 100 to the navigation device 200. In response thereto, in the navigation device 200, the second arithmetic processing element 220 recognizes the advertisement information, and then make the output device 202 output the advertisement information. As a result, it becomes possible to transfer the advertisement information to the user through the navigation device 200. Here, instead of the navigation device 200, it is possible to make the user browse the advertisement information through a terminal device such as a personal computer or a cellular phone.

The advertisement information includes information concerning the advertiser as the business operator, or business operators (for example, a distributing agent) having economic relationship with the advertiser (for example, a manufacturer), and goods or services thereof. The advertisement information transferred to the user may include temporal factor such as business hours of each business operator. The business operators may include restaurants, hotels, gas stations, hospitals, educational establishments, libraries and the like.

Among numerous advertisement information, the advertisement information related to business operators positioned in a range with high possibility of the vehicle 2 traveling thereto, in view of the current position of the vehicle 2 recognized on the basis of communication with the navigation device 200, may be selected, and then delivered to the navigation device 200. The advertisement information may be selected on the basis of information representing preference by the user with respect to the business operators and the like, such as a commercial transaction history of the user recognized on the basis of communication with the navigation device 200 and the like, and then delivered to the navigation device 200.

Subsequently, the first support arithmetic processing element 110 executes "a first determination processing" for each business operator identified by a business operator identification information. Specifically, it is determined whether or not the position of the business operator related to the advertisement information is registered as a destination position candidate in the navigation device 200, on the basis of communication with the navigation device 200 (or other terminal device) (FIG. 2/STEP012).

For example, the navigation device 200 is configured so that the advertisement information displayed at the output device 202 may be registered in a favorites list when designated by the user through operation of the input device 201. Upon registering the designated advertisement information, a display including YES and NO key for confirming willingness of registration to the list may be displayed at the output device 202. Thereafter, data reporting that the position of the business operator is registered as the destination position candidate is transmitted from the navigation device 200 to the navigation server 100. On the basis of such data, the first support arithmetic processing element 110 is capable of recognizing the registered number of the position of the business operator related to the advertisement information as the destination position candidate, for each of a plurality of the advertisement information.

Here, instead of the navigation device 200, it is possible to make the user register the position of the business operator related to the advertisement information as the destination position candidate, through terminal devices such as a personal computer or a cellular phone. In this case, it is configured so that the first determination processing is executed by transmitting the registered result from the terminal device such as the personal computer or the cellular phone to the navigation server 100, and that the registration of the destination position candidate to the favorite list of the destination position candidate is made by transmitting the registered result to the navigation device 200.

In the case where the result of the first determination processing is positive (FIG. 2/STEP012 . . . YES), a second support arithmetic processing element 120 cumulatively calculates a first index value $e_1$ so that the first index value $e_1$ increases by a first frequency $\Delta e_1$ (>0) per one registration, for the advertisement information related to the business operator in which the number of its location registered as the destination position candidate increased (FIG. 2/STEP016). On the other hand, in the case where the result of the first determination processing is negative (FIG. 2/STEP012 . . . NO), the first index value $e_1$ is maintained as it is for the advertisement information related to the business operator in which the number of its location registered as the destination position candidate did not change.

Further, the first support arithmetic processing element 110 executes "a second determination processing" for each business operator identified by the business operator identification information. Specifically, it is determined whether or not the position of the business operator related to the advertisement information is set as a destination position $p_2$ in the navigation device 200, on the basis of communication with the navigation device 200 (FIG. 2/STEP022).

For example, the navigation device 200 is configured so that the destination position may be set, while one or a plurality of the advertisement information among the advertisement information displayed at the output device 202 is designated by the user through operation of the input device 201, and at the same time the address of the location or a map of the area is displayed by the output device 202. Further, the navigation device 200 may be configured so that the position of the one destination position candidate or the position of the business operator may be set as the destination position, when the one destination position candidate is designated among the destination position candidate registered in the favorite list.

Thereafter, by data reporting that the position of the business operator is set as the destination position being transmitted from the navigation device 200 to the navigation server 100, the first support arithmetic processing element 110 is capable of recognizing the number of the position of the business operator related to the advertisement information set as the destination position, for each of a plurality of the advertisement information, on the basis of such data.

In the case where the result of the second determination processing is positive (FIG. 2/STEP022 . . . YES), the second support arithmetic processing element 120 cumulatively calculates a second index value $e_2$ so that the second index value $e_2$ increase by a second frequency $\Delta e_2$ (for example, $\Delta e_1 < \Delta e_2$) per one setting, for the advertisement information related to the business operator in which the number of its location set as the destination position increased (FIG. 2/STEP026). On the other hand, in the case where the result of the second determination processing is negative (FIG. 2/STEP022 . . . NO), the second index value $e_2$ is maintained as it is for the advertisement information related to the business operator in which the number of its location set as the destination position did not change.

Further, the first support arithmetic processing element 110 executes "a third determination processing" for each business operator identified by the business operator identification information. Specifically, first, of the positions at each time of the vehicle 2, the existence or nonexistence of the position satisfying "a first condition" in relationship with the position of the business operator is determined on the basis of the probe information recognized as is explained above, that is, on the basis of the time-series position of the vehicle 2 (FIG. 2/STEP032).

As "the first condition", for example, a condition that the measured position of the user or the vehicle 2 (more accurately, the navigation device 200) represented by the probe information is included in a business transaction range taking the position of the business operator as the reference. As "the business transaction range", an establishment of the business operator specified by the support map information (including parking lots and the like), a section specified by a street address including an address of the business operator, or a circular or rectangular region taking a coordinate registered as the position of the business operator as the center thereof, or the like may be adopted.

Figure 3:
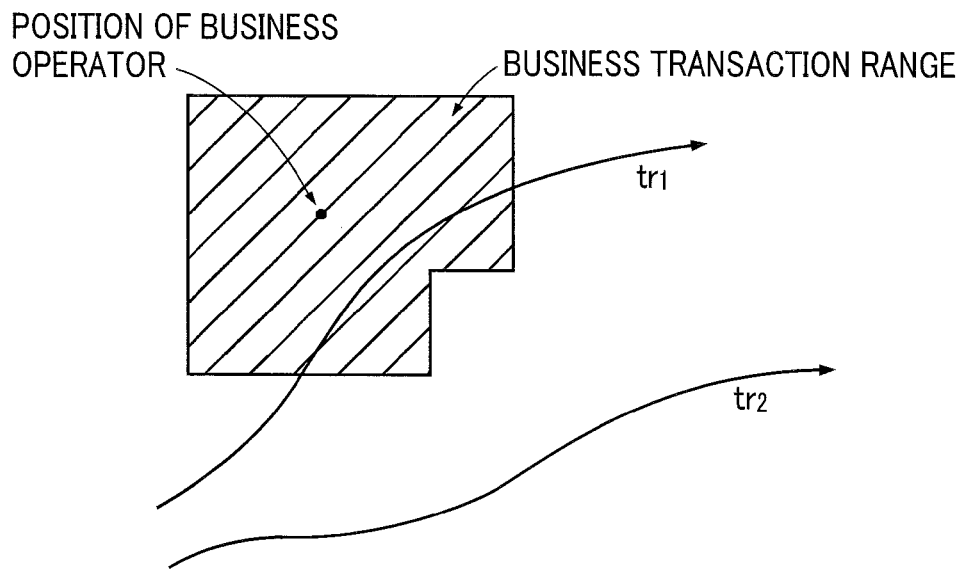
FIG. 3 is an explanatory view with respect to evaluation method of an advertisement effectiveness.
Figure 3:
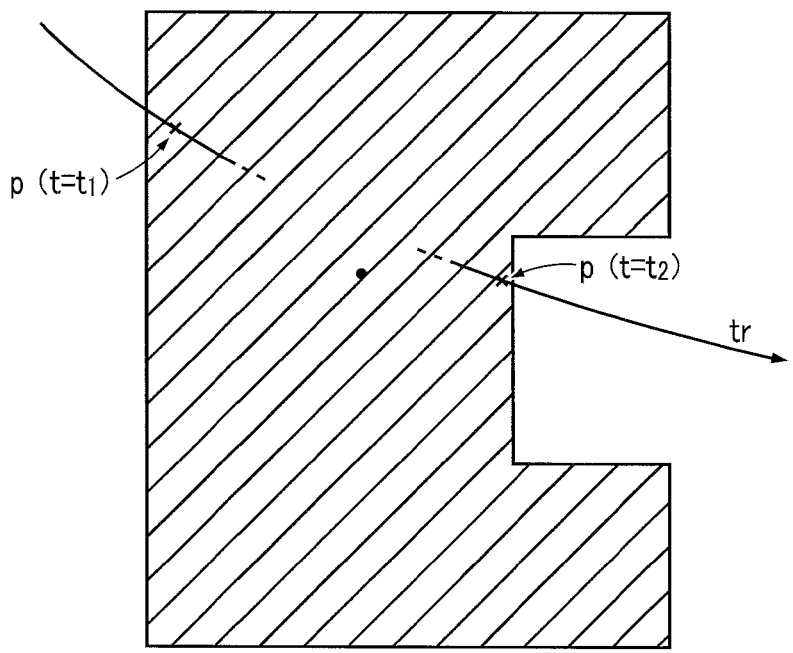

In FIG. 3(a), a first trajectory tr1 of the vehicle 2 is passing the business transaction range (shaded portion) including the business operator position, so that it is determined that the measured position satisfying the first condition exists with respect to the probe information representing the first trajectory tr1. On the other hand, in FIG. 3(a), a second trajectory tr2 of the vehicle 2 deviates from the business transaction range including the business operator, so that it is determined that the measured position satisfying the first condition does not exist with respect to the probe information representing the second trajectory tr2 of the vehicle 2.

In the case where it is determined that the measured position satisfying the first condition exists (FIG. 2/STEP032 . . . YES), then it is determined whether a one or a plurality of the measurement time of the position satisfies "a second condition" in relationship with the temporal factor with respect to the business transaction with the business operator (FIG. 2/STEP034).

As "the second condition", a condition that the one or a plurality of the time in which the position of the vehicle 2 satisfying the first condition is included in the business hour of the business operator (the temporal factor). If the advertisement information includes contents related to special sales of goods in a specific time zone, then the specific time zone may be adopted as the business hours.

As is shown in FIG. 3(b), a situation where the trajectory tr of the vehicle 2 is passing the business transaction range, the position of the vehicle 2 is first measured in the business transaction range at time $t=t_1$, and the position of the vehicle 2 is lastly measured at time $t=t_2$, will be considered.

In this situation, in the case where a time of first position measurement $t=t_1$ in the business transaction range is included in the business hours, then it is determined that time $t_1$ satisfies the second condition. In the case where the time of last position measurement $t=t_2$ in the business transaction range is included in the business hours, then it may be determined that time $t_2$ satisfies the second condition.

Further, as "the second condition", a condition that a sojourn time of the user in the business transaction range is included in a typical time range (the temporal factor) necessary for business transaction with the business operator, may be adopted. "The typical time range" may be set individually according to the difference in the category of business or retail premises and the like, such as the typical time range being set to one hour or more in the case where the business operator is a shopping mall, and the range being set to 15 minutes or more and one hour or less in the case where the business operator is a fast food restaurant.

In the situation shown in FIG. 3(b), the difference $t_2-t_1$ between the time of first position measurement $t_1$ and the time of last position measurement $t_2$ in the business transaction range is calculated as the sojourn time of the vehicle 2 or the user in the business transaction range. Thereafter, in the case where the sojourn time falls within the typical time range, it is determined that the time $t_1$ and time $t_2$ satisfy the second condition.

In the case where the result of the third determination processing is positive (FIG. 2/STEP032 ... YES and STEP034 ... YES), then the second support arithmetic processing element 120 cumulatively calculates a third index value $e_3$ for the advertisement information related to the subject business operator, so that the third index value $e_3$ increase by a third frequency $\Delta e_3$ per one setting (for example, $\Delta e_2 < \Delta e_3$) (FIG. 2/STEP036). On the other hand, in the case where the result of the third determination processing is negative (FIG. 2/STEP032 ... NO or STEP034 ... NO), then the third index value $e_2$ is maintained as it is for the advertisement information related to the subject business operator.

The second support arithmetic processing element 120 executes an advertisement effectiveness reporting processing (FIG. 2/STEP040). By doing so, after calculating a sum $\Sigma_k e_k$ or a weighted sum $\Sigma_k c_k e_k$ (for example, $0 < c_1 < c_2 < c_3$) of the first index value $e_1$, the second index value $e_2$, and the third index value $e_3$ for each advertisement information, the same is transmitted from the navigation server 100 to the terminal device 300 of the advertiser of the relevant advertisement information. In accordance thereto, in the terminal device 300 of the advertiser, the sum of the index values are output for each advertisement information.

(Operation and Effect of the Navigation System)

According to the navigation system exerting the above-explained function, it is determined whether or not the one or a plurality of the time in which the position of the navigation device 200 (the user or the vehicle 2) at each time which satisfies "the first condition" in relationship with the position of the business operator, satisfies "the second condition" with respect to the temporal factor related to the business transaction of the business operator (refer to FIG. 2/STEP 032, STEP034). Thereafter, according to the relevant determination result, the interest level of the user with respect to the business operator and the like is evaluated as "the third index value" (refer to FIG. 2/STEP036).

As is explained above, as the second condition, a condition that the one or a plurality of the time in which the position of the navigation device 200 satisfies the first condition is included in the business hour of the business operator, is adopted. By doing so, it becomes possible to avoid the situation where the interest level of the user with respect to the business operator and the like is evaluated highly, even when the user visited a vicinity area of the business operator after the business hours of the business operator, and there is little probability that the user is intending a business transaction with the business operator.

Further, as the second condition, a condition that the sojourn time of the user in the business transaction range which is calculated on the basis of a plurality of the time in which the position of the navigation device 200 satisfies the first condition, is included in the typical time range is adopted. By doing so, it becomes possible to avoid the situation where the interest level of the user with respect to the business operator and the like is evaluated highly, even when the user sojourns in the vicinity range of the business operator for an extremely short time or extremely long time, and there is little probability that the user is intending a business transaction with the business operator in view of the typical time range necessary for the business transaction.

As is explained above, the advertisement effectiveness, specifically the interest level the user bears to the business operator and the like, may be determined with high precision as the third index value $e_3$, not only based on the simple positional relationship between the business operator and the user of the navigation device, but taking into consideration the time-sequential positional relationship of the two or the time variable behavior of the positional relationship.

Further, the first index value $e_1$ representing the interest level of the user with respect to the relevant business operator and the like is evaluated according to whether or not the position of the business operator is registered as the destination position candidate in the navigation device 200 (refer to FIG. 2/STEP012, STEP016). By doing so, the interest level the user bears to the business operator and the like is evaluated as the first index value $e_1$, according to the existence or nonexistence of the possibility that the user makes the navigation device execute guiding or leading to the position of the business operator as the destination position of the user in the future based on the existence or nonexistence of the registration of the position of the business operator as the destination position candidate, and consequently, the level of possibility the user visits the business operator.

Further, the second index value $e_2$ representing the interest level of the user with respect to the relevant business operator and the like is evaluated, according to existence or nonexistence of setting of the position of the business operator as the destination position in the navigation device 200 (refer to FIG. 2/STEP022, STEP026). By doing so, the interest level the user bears to the business operator and the like is evaluated as the second index value $e_2$, according to the existence or nonexistence of the intention of the user to make the navigation device 200 guide or lead to the position of the business operator as the destination position, and consequently, the level of probability of the user traveling to or have visited the business operator.

The advertisement effectiveness may be determined with high precision, by evaluating the first index value $e_1$ and the second index value $e_2$, in addition to the third index value $e_3$.

(Other Embodiments of the Present Invention)

Not all of the first index value $e_1$, the second index value $e_2$, and the third index value $e_3$, but a part of the index values only may be evaluated, on condition that the third index value e3 is included, such as the second index value $e_2$ and the third index value $e_3$ only.

The invention claimed is:
1. A navigation system for determining advertisement effectiveness, the navigation system comprising:

a navigation server having a network communication function with a navigation device mounted on a vehicle and a terminal device of an advertiser;

the navigation server further comprising:
a processor; and
a storage device storing traffic information and advertisement information;

the storage device further storing instructions that, when executed by the processor, cause the processor to perform the steps of:
periodically measuring a position of the navigation device;
recognizing that a current position of the navigation device is in a business transaction range;
recognizing, based on a pre-determined geographical area that encompasses the business transaction range, at least one advertisement associated with a business having an identified business location and business hours;
communicating, by the navigation server, the at least one advertisement to the navigation device;
receiving a selection of the advertisement information from the navigation device;
determining, based on the received selection, that the business is registered in a favorites list on the navigation device;
incrementing a first value indicative of a number of registered business location;
receiving destination position information from the navigation device;
determining, based on the received destination position information, that the business location is set as a destination of the navigation device;
calculating a traveling time for one or more support routes connecting the current position of the navigation device and the registered destination position of the business location based on a first road traffic information and a second road traffic information;
periodically receiving probe information from the navigation device;
determining, based on the probe information, the navigation device is passing within the business transaction range of the business;
measuring, based on the determination that the navigation device is passing within the business transaction range of the business, a first time during the identified business hours;
receiving additional probe information from the navigation device;
determining, based on the additional probe information, that the current position of the navigation device is within the business transaction range of the business;
measuring, based on the determination that the current position of the navigation device is within the business transaction range of the business, a second time during the identified business hours;
calculating a sojourn time that the navigation device spent at the predetermined geographical area during the identified business hours based on the first time and the second time, and then incrementing a second value indicative of a number of user visitations to the business;
calculating a value indicative of the advertisement effectiveness using the second value indicative of the number of user visitations to the business and the first value indicative of the number of business locations; and
transmitting the value indicative of the advertisement effectiveness from the navigation server to the terminal device of an advertiser of the advertisement.

2. The navigation system according to claim 1, wherein determining whether the position of the business is set as the destination position in the navigation device based on communication with the navigation device;
incrementing a first value indicative of a number of times the position of the business is set as the destination position in the navigation device when the position of the business is set as the destination position in the navigation device,
wherein the first value indicative of a number of times the position of the business is set as the destination position in the navigation device is used in calculating the value of the advertisement effectiveness.

3. The navigation system according to claim 2, wherein the value of the advertisement effectiveness is increased more for each determination that the position of the business is set as the destination position in the navigation device than for a determination that the business location is registered as a destination position candidate in the favorites list on the navigation device.

* * * * *